(12) United States Patent
Wilson et al.

(10) Patent No.: US 9,979,193 B2
(45) Date of Patent: May 22, 2018

(54) GENERATION PLANT CONTROL APPARATUS AND METHOD

(75) Inventors: Douglas Harman Wilson, Edinburgh (GB); Luis Fernando Ochoa, Edinburgh (GB)

(73) Assignee: Psymetrix Limited, Edinburgh (GB)

( * ) Notice: Subject to any disclaimer, the term of this patent is extended or adjusted under 35 U.S.C. 154(b) by 1009 days.

(21) Appl. No.: 13/508,609

(22) PCT Filed: Dec. 16, 2010

(86) PCT No.: PCT/GB2010/052120
§ 371 (c)(1),
(2), (4) Date: Aug. 13, 2012

(87) PCT Pub. No.: WO2011/073670
PCT Pub. Date: Jun. 23, 2011

(65) Prior Publication Data
US 2013/0043690 A1   Feb. 21, 2013

(30) Foreign Application Priority Data

Dec. 16, 2009   (GB) .................................. 0921909.8

(51) Int. Cl.
*H02J 1/00* (2006.01)
*H02J 3/18* (2006.01)
*H02J 3/46* (2006.01)

(52) U.S. Cl.
CPC .............. *H02J 3/1807* (2013.01); *H02J 3/46* (2013.01); *Y02E 40/30* (2013.01)

(58) Field of Classification Search
CPC ............ H02J 3/1807; H02J 3/46; Y02E 40/30
(Continued)

(56) References Cited

U.S. PATENT DOCUMENTS

| 6,118,678 A * | 9/2000 | Limpaecher ........ H02M 5/4505 |
| | | 307/109 |
| 2004/0010350 A1 | 1/2004 | Lof et al. |
| 2010/0276930 A1* | 11/2010 | Fortmann ............... F03D 9/003 |
| | | 290/44 |

FOREIGN PATENT DOCUMENTS

| DE | 102007049251 A1 | 4/2009 | |
| WO | WO 2009049822 A2 * | 4/2009 | ............. F03D 9/003 |

OTHER PUBLICATIONS

Begovic, Miroslav, "Issues Related to the Implementation of Synchrophasor Measurements", Proceedings of the 41st Hawaii International Conference on System Sciences, IEEE, Piscataway, NJ, USA, Jan. 1, 2008, 10 pages.

(Continued)

*Primary Examiner* — Alfonso Perez Borroto
(74) *Attorney, Agent, or Firm* — GE Global Patent Operation; Scott R. Stanley

(57) ABSTRACT

A method of controlling an output of a generation plant (2) that is connected to a bulk electrical power network (4) by an electrical route (6). The method comprises determining (31) a phase angle difference between a first phase angle representing a phase angle of a voltage waveform at an output of the generation plant (2) and a second phase angle representing a phase angle of a voltage waveform at a location within the bulk electrical power network (4). The phase angle difference is compared (32) to a threshold phase angle difference that represents a constraint on the electrical route (6). The output of the generation plant (2) is controlled (33, 34) based on the comparison to prevent overloading of the electrical route (6).

19 Claims, 4 Drawing Sheets

(58) Field of Classification Search
USPC .............................. 307/87; 290/40 B, 44, 55
See application file for complete search history.

(56) References Cited

OTHER PUBLICATIONS

Phadke, A G, "Synchronized Phasor Measurements in Power Systems", IEEE Computer Applications in Power, IEEE Inc., New York, US, vol. 6, No. 2, Apr. 1, 1993, 6 pages.
Rocha, Daniel, "International Search Report" for PCT/GB2010/052120, dated Sep. 16, 2011, 4 pages.
Price, Elmo, "Practical Considerations for Implementing Wide Area Monitoring, Protection and Control", Protective Relay Engineers, 2006, 59th Annual Conference for Texas, USA, Apr. 4, 2006, pp. 36-47.

* cited by examiner

GENERATION PLANT CONTROL APPARATUS AND METHOD

FIELD OF THE INVENTION

The present invention relates to an apparatus for and method of providing for control of an electrical generation plant, such as a renewable energy generation plant with a non-firm connection to an electrical grid.

BACKGROUND TO THE INVENTION

In electrical power networks comprising renewable generation plants, such as wind power generation plants, network utilisation of the generation plants tends to be low because of conservative assumptions about available power and network loading. Typically, in a network comprising wind power generation plants, which may include wind farms, the amount of wind generating capacity that is permitted to be connected to the network is limited by the condition in which wind generation is high and network loading is low, which results in worst case power flow into the network and voltage rise. The worst case condition particularly affects the area here defined as the electrical route.

As used herein the term 'generation plant' encompasses any apparatus for generating electrical power. A generation plant may comprise a single generator. Alternatively a generation plant may comprise a plurality of generators in a cluster controlled together, such as for example a wind farm. Alternatively, a generation plant may comprise a plurality of clusters of generators, such as for example a plurality of wind farms at separate locations within an electrical power network.

As used herein the term 'electrical route' encompasses any electrical connection between a generation plant and a bulk electrical power network. The electrical route may for example be a transmission or distribution line. There may be one or more additional generation plants and/or load connections along an electrical route. The electrical route may have a number of technical limits restricting the transfer of power from a generation plant to a bulk electrical power network.

As used herein, the term 'bulk electrical power network' encompasses the part of the wider electrical power network separate to the generation plant and the electrical route. The bulk electrical power network may be termed a 'stronger' part of the network relative to the electrical route. That is, the bulk electrical power network is able to accept larger power transfer than may be handled by the electrical route.

If network loading is low and wind generation power is high then the power from the wind generation plant may overload and/or provoke voltage rise in parts of the electrical route. Therefore, in known electrical power networks the declared nominal capacity of the wind power generation plant is limited such that overload or excessive voltage rise issues do not arise under the worst case conditions.

Generally, the coincidence of high wind and low load seldom occurs.

There have been attempts to take detailed real-time measurements in the network and derive less conservative constraints in a centralised process. However, these attempts have not been widely adopted because they might require the installation of a large number of real-time measurement devices and associated communications channels.

STATEMENT OF INVENTION

The present inventors have devised an approach to determining operating constraints for a generation plant in an electrical grid (or electrical power network) that enables the connection of greater generation capacity to a given network without extensive measurements and/or control complexity.

It is therefore an object for the present invention to provide an electrical grid configured to make measurements in the grid to thereby provide for improved generation plant control.

It is therefore a further object for the present invention to provide a method of providing for improved control of a generation plant in an electrical grid, the method involving the making of measurements in the electrical grid.

It is a further object of the invention to increase the feasible energy transfer through an electrical route without compromising the safety and security of the electrical route.

According to the invention in a first aspect there is provided A method of controlling an output of generation plant connected to a bulk electrical power network by an electrical route, the method comprising: determining a phase angle difference between a first phase angle and a second phase angle; and controlling the output of the generation plant in dependence on the value of the phase angle difference, wherein the first phase angle corresponds to a phase angle of a voltage waveform at an output of the generation plant, and wherein the second phase angle corresponds to a phase angle of a voltage waveform at a location in the bulk electrical power network.

By using phase angle difference measurements the invention is able to determine the limit of power injections from a generation plant into the bulk electrical power network without overloading or excessive voltage rise of any part of the electrical route between the generation plant and the bulk electrical power network. The invention is able to control output of a generation plant (i.e. the amount of electrical power injected to the electrical power network) based on the amount of electrical power the electrical power network is able to receive over the electrical route.

Given that the phase angle difference between two points reflects the impedance of the corresponding part of the electrical power network, as well as its loading and generation at any given moment, it is possible to determine the amount of power generation that keeps the operation of the electrical power network safe without overload or excessive voltage rise. This means that typically only two measurements are required for each electrical route from a generation plant to a bulk electrical power network. This allows the control of the power flow into an electrical power network with a small number of measurements. In contrast, known systems such as those that require direct measurements of current and voltage require a high number of measurements to be taken at several points around the electrical route. When an electrical power network is complex and includes many substations and generation plants, there can be several constraining factors, and measurement of current and voltage may be required at each substation and generation plant.

Further, when using phase angle difference to determine safe operation levels of a generation plant the control mechanism for a generation plant may be made simpler. That is, the logic required in a generation plant controller to control a generation plant is only required to handle one phase angle difference for each electrical route of the generation plant to the bulk electrical power network.

Optionally, the first phase angle may correspond to a phase angle of a voltage at a connection of the generation plant to the electrical route.

Optionally, the second phase angle may correspond to a phase angle of a voltage at a connection of the bulk electrical power network to the electrical route.

Optionally, controlling the output of the generation plant may comprise increasing or decreasing the output of the generation plant in dependence on the value of the determined phase angle difference.

Optionally, controlling the output of the generation plant may comprise comparing the determined phase angle difference to a predetermined threshold phase angle difference.

An increase in the phase angle difference may indicate that the electrical power network is able to receive less electrical power from the generation plant. Therefore it is advantageous to decrease the output from the generation plant as the phase angle difference increases.

Optionally, controlling the output of the generation plant may comprise reducing the output of the generation plant in dependence on the determined phase angle difference being greater than or equal to a predetermined threshold phase angle difference.

The threshold phase angle difference may, for example, indicate the maximum allowable phase angle difference before overloading or voltage rise occurs. Therefore, output from the generation plant may be ceased if the phase angle difference is greater than or equal to the threshold. Alternatively, the threshold may represent the phase angle difference above which the output of the generation plant should be decreased.

Optionally, controlling the output of the generation plant may comprise increasing or decreasing the output of the generation plant to maintain the determined phase angle difference less than or equal to the threshold phase angle difference.

Optionally, the threshold may be determined based on the thermal constraints of the electrical route.

Optionally, determining the threshold phase angle difference based on the thermal constraints of the electrical route may comprise modelling the phase angle difference under a specific condition of load on the electrical route and under a specific condition of generated electrical power connected to the electrical route.

Optionally, the specific condition of load on the electrical route and the specific condition of generated electrical power connected to the electrical route may be determined to model the production of thermal overload.

Optionally, the specific condition of load on the electrical route may be minimum load, and wherein the specific condition of generated electrical power connected to the electrical route may be maximum generated electrical power connected to the electrical route.

Optionally, the threshold phase angle difference may be determined based on at least one of: the voltage rise constraints of the bulk electrical power network; the reverse power flow constraints of the bulk electrical power network; the transient stability of the bulk electrical power network; and the voltage stability and the oscillatory stability of the bulk electrical power network.

Optionally, the threshold phase angle difference may be determined based on at least one of: the voltage rise constraints of the electrical route; the reverse power flow constraints of the electrical route; the transient stability of the electrical route; and the voltage stability and the oscillatory stability of the electrical route.

An electrical power network and/or an electrical route may be constrained by a number of factors. If the constraints of the electrical power network and/or the electrical route are exceeded then failures and faults within the electrical power network may be seen. By adapting embodiments of the invention to determine a threshold based on different types of constraints the invention is able to ensure that each of the types of constraint is not exceeded.

Optionally, the method may further comprise measuring the first phase angle at a connection point of the generation plant to the electrical route.

Measuring the first phase angle at the point of connection of the generation plant to the electrical route is advantageous as a measurement unit may be easily fitted to a generation plant connection point as it is easily accessible. In contrast, fitting measurement units at locations along an electrical route between a generation plant and a bulk electrical power network, as required in known methods, may be more difficult. Additionally, a measurement unit may be installed when the generation plant connection point is installed, therefore obviating the need to retrofit the measurement unit.

In exemplary embodiments, the electrical route may be connected to the electrical power network at a substation of the bulk electrical power network. Therefore the second phase angle measurement may be measured at the substation. This is advantageous because substations are easily accessible and measurement units for measuring phase angles may be positioned at a substation without undue effort or large amounts of disruption to the electrical power network.

Optionally, the method may further comprise measuring the second phase angle at a connection of the bulk electrical power network to the electrical route.

Optionally the generation plant is connected to the bulk electrical power network through first and second electrical routes and the phase angle difference is a first phase angle difference corresponding to the phase angle difference across the first electrical route, the method may further comprise: determining a second phase angle difference between the first phase angle and a third phase angle; and controlling the output of the generation plant in dependence on the first and/or second determined phase angle differences, wherein the third phase angle corresponds to a voltage waveform at a location within the bulk electrical power network, and wherein the second phase angle difference corresponds to the phase angle difference across the second electrical route.

In exemplary embodiments, two electrical routes with two different connection locations at the bulk electrical power network require the measurement of two phase angle differences. The first phase angle difference corresponds to the voltage phase angle at the generation plant and the connection of the first electrical route to the bulk electrical power network. The second phase angle difference corresponds to the generation plant and the connection of the second electrical route to the bulk electrical power network. The output of the generation plant is controlled in dependence on the first and/or second phase angle differences.

Optionally, controlling the output of the generation plant may comprise decreasing output of the generation plant in dependence on the first phase angle difference being greater than or equal to a first predetermined threshold phase angle difference and/or the second phase angle difference being greater than or equal to a second predetermined threshold phase angle difference.

The first phase angle difference will be compared with a first predetermined threshold phase angle difference such that the corresponding electrical route does not encounter any overload or overvoltage. By determining a second phase angle difference that will be compared with a second predetermined threshold phase angle difference such that the corresponding electrical route does not encounter any overload or overvoltage, exemplary embodiments of the invention are able to control generation plant output based on one or both phase angle differences.

This is advantageous as the generation plant output may be adjusted to suit the phase angle difference of any of the electrical routes.

Optionally, controlling the output of the generation plant may comprise increasing or decreasing the output of the generation plant to maintain the first phase angle difference less than or equal to a first threshold phase angle difference and/or to maintain the second phase angle difference less than or equal to a second threshold phase angle difference.

Optionally, controlling the output of the generation plant may comprise decreasing the output of the generation plant as the value of the first phase angle difference and/or the second phase angle difference increases.

In exemplary embodiments of the invention two thresholds may be determined. The first threshold is primarily representative of the constraints on the first electrical route. The second threshold is primarily representative of the constraints on the second electrical route. The generation plant output may be limited based either one of the thresholds, whichever is the more restrictive on the power output of the generation plant. Therefore, no overload or excessive voltage rise occur at either the first or the second electrical routes.

In exemplary embodiments of the invention the generation plant may be connected to the bulk electrical power network by more than two electrical routes. In such embodiments, a threshold phase angle difference and a determined phase angle difference may be provided for each of the electrical routes. The output of the generation plant may be controlled in dependence on the relative value of one or more of the determined phase angle differences with the corresponding threshold phase angle difference.

According to the invention in a second aspect there is provided a computer program product configured to store computer program code executable to carry out the method according described above.

According to the invention in a third aspect there is provided an apparatus comprising a processor configured to carry out the method described above.

According to the invention in a fourth aspect there is provided a generation plant controller comprising the apparatus described above.

According to the invention in a fifth aspect there is provided an electrical power network comprising a generation plant controller as described above.

Optionally, the invention may comprise an electrical grid (or electrical power network) comprising: an electrical connection (or electrical route) to a generator (or generation plant), the generator being thereby connected in a non-firm fashion to the electrical grid; first and second measurement apparatus operable to derive first and second voltage phasor signals from respective first and second measurements made at locations spaced apart on the electrical connection; processing apparatus operable to receive the first and second voltage phasor signals, determine an angle difference (or phase angle difference) between the first and second voltage phasor signals, compare the angle difference with a threshold value and transmit a generator control signal to the generator in dependence on the comparison.

In use, the first voltage phasor signal is derived from the first measurement made at a first location on the electrical route by means of the first measurement apparatus, and the second voltage phasor signal is derived from the second measurement made at a second location on the electrical route by means of the second measurement apparatus. The processing apparatus is operable to transmit the generation plant control signal in dependence on the first and second voltage phasor signals. This approach may involve installing far fewer communications links than known approaches. Furthermore, the first and second measurement apparatus, e.g. in the form of phasor measurement units (PMUs), may already be installed in the electrical grid, thereby providing for a further easing of the installation overhead. Processing apparatus that is susceptible to modification to operate in accordance with the invention may also be already installed. The phase angle difference between the first and second voltage phasor signals is indicative of the loading imposed on the network by load demand, existing firm and non-firm generation plant output and the new non-firm generation plant output.

A voltage phasor signal includes a phase angle and a magnitude of the signal being measured. In certain exemplary embodiments of the invention a voltage phasor signal may be measured. In alternative exemplary embodiments a phase angle alone may be measured.

The determination of the phase angle difference between the first and second voltage phasor signals and the comparison of the phase angle difference with the threshold value may provide a simpler approach to implementing a constraint than the known approaches. That is, there may be fewer rules in the control logic for controlling the output of the generation plant using phase angle difference measurements compared with other methods, thus providing a simpler control mechanism.

The term 'non-firm connection' as used herein means a connection between a generation plant and the electrical grid that is governed by an agreement whereby the generation plant's access to the network is not guaranteed and the generation plant can be constrained at times by the network operator or an autonomous control scheme to ensure the security and reliability of the network.

More specifically, a time of each of the first and second measurements may be determined. Thus, the electrical grid may comprise at least one time determining apparatus, such as a Global Positioning System (GPS) time source, which is operative to determine a time of measurement. In use, the determined time for each of the first and second measurements may provide a means to derive a time synchronised phasor representation of the fundamental frequency component, e.g. 50 or 60 Hz, of each of the first and second measurements.

Alternatively or in addition, the electrical grid may comprise a plurality of generators, e.g. in the form of a wind farm. The plurality of generators may be comprised within one or more of at least one wind power generation plant, at least one photovoltaic generation plant and at least one small hydroelectric generation plant. At least one of the generation plants may be connected to the grid in a firm fashion. In a form of the invention, the plurality of generation plants may be connected in a non-firm fashion to the grid at one point and one of the voltage phasor signals may be derived on the basis of measurements made near the connection point.

Alternatively or in addition and where the electrical grid comprises at least one generation plant connected to the grid in a firm fashion, the processing apparatus may be operative: to allocate a certain level of firm capacity; and to determine further non-firm capacity on the basis of the voltage phasor measurements. In use, the generation plant that is connected in the non-firm fashion may supply power up to the limit of firm capacity or the non-firm limit, whichever is the greater.

Alternatively or in addition, the electrical grid may further comprise a generation plant controller operable to control the generation plant in dependence on the generation plant control signal. The electrical grid may further comprise at least one generation plant. The generation plant controller may be operable to control at least one generation plant of a plurality of generation plants.

Alternatively or in addition, the generation plant control signal may be operative to effect control of the generation plant with a feedback loop such that the phase angle difference settles to the value of the appropriate threshold in the condition where the unconstrained phase angle difference would exceed the threshold.

Alternatively or in addition, at least one of the first and second measurement apparatus may comprise a phasor measurement unit (PMU) that is operative to derive a voltage phasor signal from measurements made on the electrical route.

Alternatively or in addition, the measurement apparatus may comprise an analogue to digital converter that is operative to convert a measured signal to a digital form. Typically, a phasor measurement unit (PMU) may comprise such an analogue to digital converter.

Alternatively or in addition, the processing apparatus may be operable to transmit a generation plant control signal that is operative to reduce the generation plant output if the phase angle difference reaches the threshold value. For example and where the generation plant is a wind power generation plant, the generation plant control signal may be operative to cause the wind power generation plant to spill wind.

Alternatively or in addition, the threshold value may be between substantially 45 degrees and −45 degrees. More specifically, the threshold value may be between substantially 25 degrees and substantially −25 degrees. More specifically, the threshold value may be between substantially 10 degrees and substantially −10 degrees. More specifically, the threshold value may be between substantially 5 degrees and substantially −5 degrees. Alternatively or in addition, the threshold value may be between substantially zero degrees and substantially 45 degrees Alternatively or in addition, the threshold value may be changeable over time. For example, the threshold value may be six degrees in winter and the threshold value may be changed in summer such that it is three degrees. Alternatively, for example, a change in network infrastructure, such as the introduction of new lines, or in topology, such as by network reconfiguration, may necessitate a change in the threshold value. Alternatively, for example, the threshold value may be changed based on the output of a system for measuring the thermal capability of a line in real-time.

Alternatively or in addition, the generation plant may be a renewable energy generation plant, such a wind power generation plant. Thus, for example, where the generation plant is a wind power generation plant the control signal may be operable to control an extent to which wind is spilled by the wind power generation plant or, where there is a plurality of generators, to shut down one or some of the generators.

Spilling wind may be done through control of the pitch of the wind turbine blades. Pitch control is an approach normally used for controlling the output of wind turbines.

Alternatively or in addition, the first measurement apparatus may be operable to derive the first voltage phasor signal based on measurements made near the generation plant. Where there is a plurality of generation plants, e.g. in the form of a number wind farms, the first measurement apparatus may be operable to derive the first voltage phasor signal based on measurements made near the plurality of generation plants. The second measurement apparatus may be operable to derive the second voltage phasor signal based on measurements in or near a substation transformer where the electrical route connects to the bulk electrical power network.

Alternatively or in addition, the electrical grid may comprise a non-fully observed network, such as an electricity distribution network, which comprises the generation plant and to which the generation plant is electrically connected. A fully observed network is a network in which voltages and currents are measured at all points within the network, e.g. by means of a SCADA system. Hence, a non-fully observed network is a network in which there is either no measurement or incomplete measurement of voltages and currents in near real-time.

More specifically, the non-fully observed network may further comprise at least one of the first and second measurement apparatus. Hence, in a form of the invention both the first and second measurement apparatus may form part of the non-fully observed network. In another form of the invention, one of the first and second measurement apparatus may form part of the electricity distribution network and the other of the first and second measurement apparatus may be comprised in a part of the grid having a different voltage level to the voltage level at which the generation plant connects to the distribution network, for example, an electric power transmission network or a part of the electricity distribution network that operates at a higher voltage level than the generation plant connection. Thus, the approach may take upstream constraints at a higher distribution voltage or in the transmission network into account. In use, the one of the first and second measurements may be made on behalf of the Distribution Network Operator (DNO) and the other of the first and second measurements may be made on behalf of the operator of the generation plant.

Alternatively or in addition, the electrical grid may further comprise third measurement apparatus, which is operative to derive a third voltage phasor signal from a third measurement made in a part of the grid having a different voltage level to the voltage level at the generation plant. The first measurement apparatus may be operative to derive the first voltage phasor signal from the first measurement made near the generation plant. The second measurement apparatus may be operative to derive the second voltage phasor signal from the second measurement made at a location spaced apart from the generation plant. Generally the first and second voltage phasor signals may be derived at the ends of the electrical route.

The processing apparatus may be operative to receive the first to third voltage phasor signals and to determine a phase angle difference between the first and second voltage phasor signals and to determine another phase angle difference between the first and third voltage phasor signals. Hence, the generation plant controller may be operative to control the generation plant such that neither of the phase angle differences exceeds its respective threshold value. Thus, the generation plant controller may be operative such that the more restrictive angle constraint binds first.

Alternatively or in addition, at least one grid apparatus, such as a transformer, may be disposed between the first and second measurement apparatus. Thus, the electrical route may be constituted by plural electrical routes, such as by a first electrical route between the first measurement apparatus and the grid apparatus and a second electrical route between the grid apparatus and the second measurement apparatus.

Further embodiments of the first aspect of the present invention may comprise one or more features of the second aspect of the present invention.

Optionally, the invention may comprise a method of providing for control of a generation plant in an electrical grid, the generation plant being connected in a non-firm fashion to the electrical grid, the method comprising: making first and second measurements by means of first and second measurement apparatus respectively at spaced apart locations on an electrical route to the generation plant and deriving respective first and second voltage phasor signals from the first and second measurements; and operating processing apparatus to receive the first and second voltage phasor signals, determine a phase angle difference between the first and second voltage phasor signals, compare the phase angle difference with a threshold value and transmit a generation plant control signal to the generation plant in dependence on the comparison.

More specifically, the method may comprise changing the threshold value over time. Hence, the method may comprise determining a threshold value in dependence on at least one of: known operating conditions in the network; measurements in the network; and variable constraints of the network.

More specifically, the method may further comprise use of a mathematical model to simulate scenarios to identify the angle threshold: establishing worst-case network loading and generation conditions, e.g. maximum generation, minimum load; identifying a violation of a limit; reducing output from the generation plant until the violation is cleared; and determining the threshold value as the phase angle difference between the first and second voltage phasor signals. In a first approach the limit may be a thermal limit. In a second approach the limit may be a voltage rise limit. A phase angle difference threshold can be defined that, if respected, ensures that the network is not operated at a higher risk than in conventional practice.

Alternatively or in addition and where the electrical grid comprises at least one generation plant connected to the grid in a firm fashion, the method may comprise: allocating a certain level of firm capacity; and determining further non-firm capacity on the basis of the voltage phasor measurements. More specifically, power may be supplied by the generation plant that is connected in the non-firm fashion to the limit of firm capacity or the non-firm limit determined by this invention, whichever is the greater.

Further embodiments of the second aspect of the present invention may comprise one or more features of the first aspect of the present invention.

According to a third aspect of the present invention, there is provided a kit of parts configured to be installed in an electrical grid comprising a generation plant, which is connected to the electrical grid in a non-firm fashion, the kit of parts comprising: first measurement apparatus that upon installation is configured to and operable to derive a first voltage phasor signal from a first measurement made at a first location on an electrical route to the generation plant; second measurement apparatus that upon installation is configured to and operable to derive a second voltage phasor signal from a second measurement made on the electrical route at a second location spaced apart from the first location; and processing apparatus that upon installation is operable to receive the measured first and second voltage phasor signals, determine a phase angle difference between the first and second voltage phasor signals, compare the phase angle difference with a threshold value and transmit a generation plant control signal to the generation plant in dependence on the comparison.

Embodiments of the third aspect of the present invention may comprise one or more features of the first aspect of the present invention.

BRIEF DESCRIPTION OF DRAWINGS

Further features and advantages of the present invention will become apparent from the following specific description, which is given by way of example only and with reference to the accompanying drawing, in which:

Referring to FIG. 1, a generation plant 2 is shown connected to a bulk electrical power network 4 by means of an electrical route 6 in accordance with an exemplary embodiment of the invention.

Figure 1:
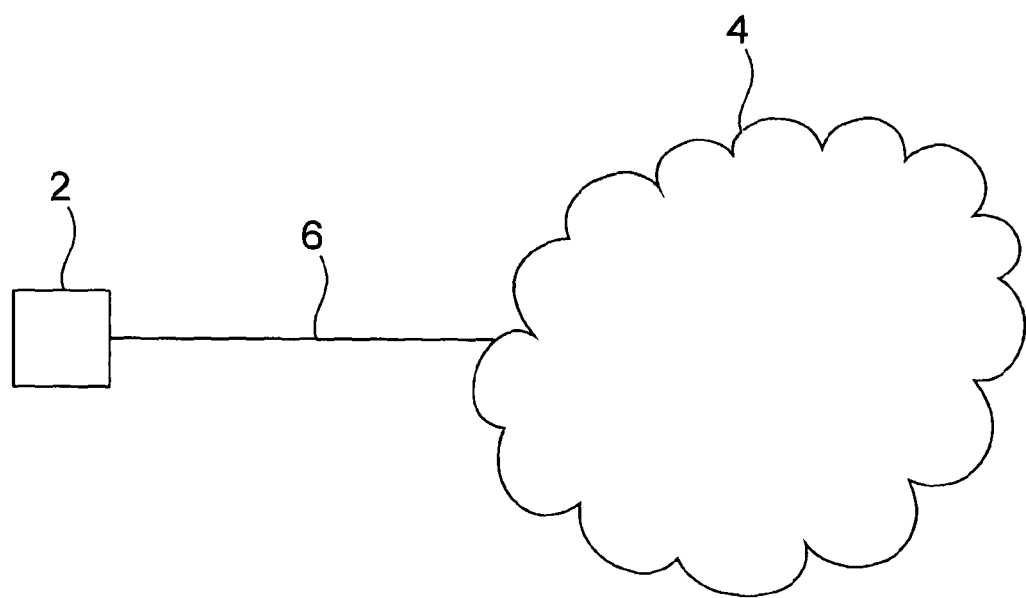
FIG. 1 is a schematic diagram showing a generation plant connected to a bulk electrical power network in accordance with exemplary embodiments of the invention.

The bulk electrical power network 4 is the stronger part of the electrical power network to which the electrical route 6 is connected. The limits on the power transfer that the invention addresses are in the electrical route 6. Normally, the electrical route 6 will connect to a higher voltage level in the bulk electrical power network 4 through a transformer (not shown).

The electrical route 6 is the electrical connection between the generation plant 2 and the bulk electrical power network 4. This can be, for example, a distribution line. There may be several other generation plants and load connections along the route. The electrical route 6 has a number of technical limits to the transfer of power. The invention is intended to increase the feasible energy transfer through the electrical route 6 without compromising the safety and security of the lines.

The generation plant 2 may be a renewable energy generation plant such as a wind power generation plant. In other exemplary embodiments the generation plant 2 may be another form of renewable electrical power generation plant. For example, the generation plant may be a wave powered generation plant or a solar powered generation plant. In yet further embodiments the generation plant 2 may be a non-renewable generation plant such as a coal fired or gas powered electrical generation plant.

The generation plant 2 will typically feature a controller able to limit the power output from the generation plant 2 to a given value. In other exemplary embodiments, the controller of a typical wind power generation plant will adjust the pitch of the blades, a process known as pitch control. This controller will also be able to receive a signal input that defines the value of the power output at which generation plant 2 is controlled.

In general the invention provides a method of controlling the output of the generation plant 2 to control the amount of electrical power it supplies to the bulk electrical power network 4 over the electrical route 6. By comparing phase angles measured at spaced apart locations along the electrical route 6, the invention is able to adjust the generation plant 2 output to avoid overload or excessive voltage rise on the electrical route.

In some exemplary embodiments the generation plant 2 may be one of a plurality of generation plants that together comprise a wind farm. In such exemplary embodiments the generation plant 2 may actually comprise the plurality of generation plants. For example, the generation plant 2 may comprise a plurality of generation plants that form a wind farm, the generation plants all feeding into a central hub 17 (shown in FIG. 2) wherein the phase angle measurements required are obtained at the hub 17. The electrical route 6 may then be connected between the central hub and the bulk electrical power network 4. In other exemplary embodiments of the invention the generation plant 2 may comprise a plurality of groups of generation plants, such as a plurality of wind farms.

In some embodiments the electrical route 6 may be a single electrical transmission or distribution line. In other exemplary embodiments of the invention the electrical route 6 may be one of a plurality of transmission or distribution lines that connect the generation plant to the bulk electrical power network 4. In such exemplary embodiments the electrical route 6 may actually comprise a plurality of electrical transmission or distribution lines. The plurality of electrical transmission or distribution lines all connect to the same location of the bulk electrical power network 4 and are therefore considered to act as a single electrical route.

In exemplary embodiments where the electrical route 6 comprises a plurality of electrical transmission or distribution lines, each of the plurality of electrical transmission or distribution lines may be connected to a single substation transformer 12 (see FIG. 2) of the bulk electrical power network 4. In alternative exemplary embodiments two or more of the plurality of electrical transmission or distribution lines may be connected to separate substation transformers of the bulk electrical power network 4. Each of substations may be located in close proximity with the other. In this way the generation plant 2 is connected to the electrical power network at a single 'location'.

For the avoidance of doubt, a single location of a bulk electrical power network 4 encompasses all points within an area of the network that may be adequately represented by one phase angle measurement. That is, a single phase angle measurement taken at a location in a bulk electrical power network 4 will be relevant to a given area within the network and may be used to determine a phase angle difference in accordance with exemplary embodiments of the invention. Therefore, in embodiments where the generation plant is connected to the electrical power network at a single location by a plurality of electrical transmission lines, one phase angle measurement may be used to represent the phase angle of the voltage at the connection of all of the plurality of transmission lines to the bulk electrical power network 4.

For example, if the impedance between two points of connection of an electrical route are an order of magnitude less than the impedance of the electrical route, then the two points of connection may be considered to be at the same location. For the purposes of some embodiments of the invention, the phase angles of the voltage at the two points of connection may be considered equivalent. In such embodiments, voltage phase angles measured at either point of connection may be used. The single location referred to above encompasses two or more substations spatially separated but for which the phase angle of a voltage at each of the two or more substations is substantially the same.

Figure 2:
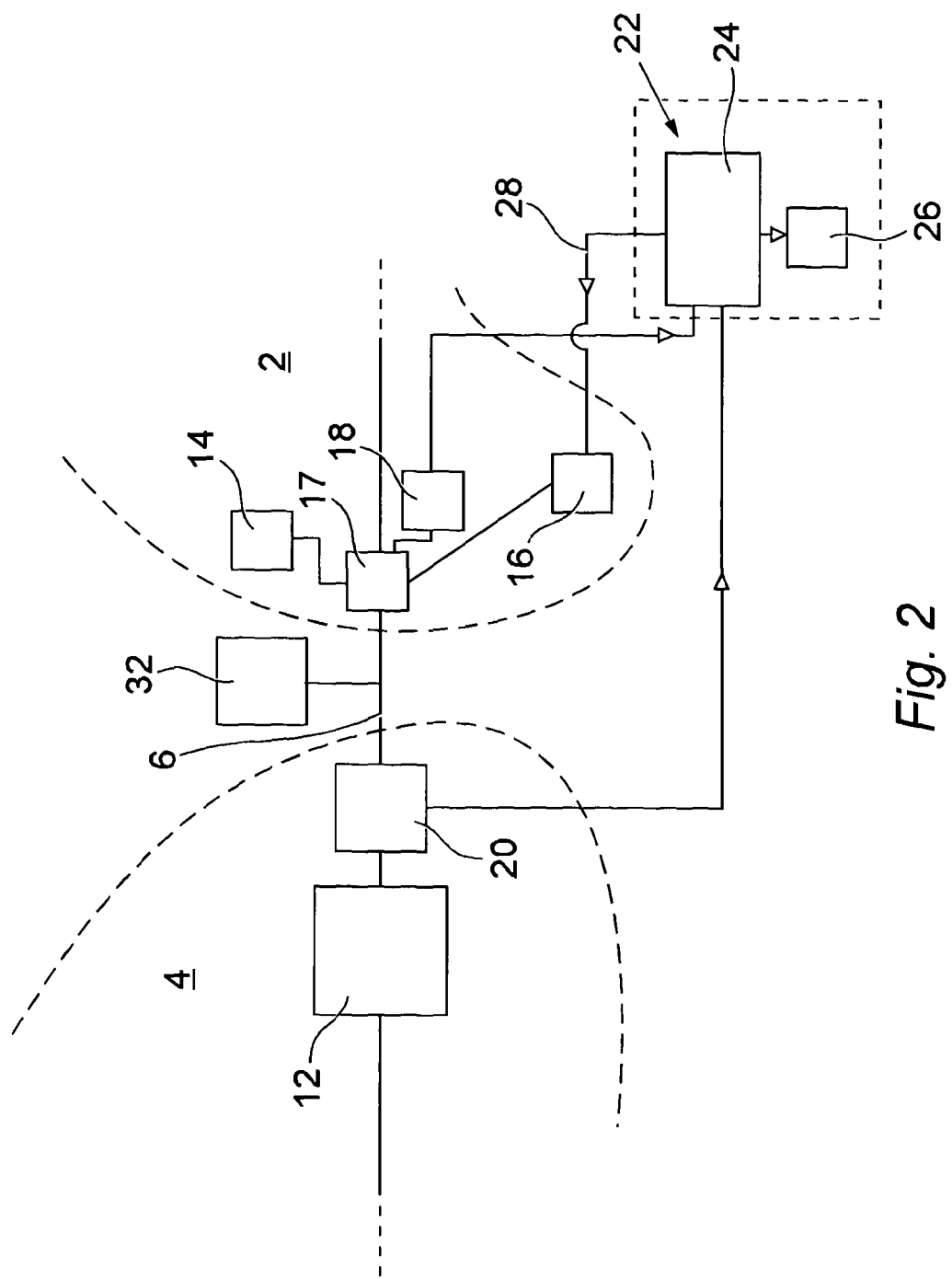
FIG. 2 is a block diagram representation of a distribution network according to exemplary embodiments of the present invention.

Referring to FIG. 2, a more detailed schematic of the arrangement of FIG. 1 is shown. A generation plant 2 is connected to a bulk electrical power network 4 (which may constitute an electrical grid and may be e.g. a transmission network) by a electrical route 6.

In the exemplary embodiment shown in FIG. 2, the generation plant 2 comprises a first wind power generation plant 14 and a second wind power generation plant 16. The first and second wind powered generation plants 14, 16 are connected to a central hub 17. A first phasor measurement unit (PMU) 18 is also connected to the central hub 17.

The central hub 17 is connected to the substation (or feeder) transformer 12 by means of the electrical route 6. For representation purposes the central hub 17 is shown in FIG. 2 as being connected to the second PMU 20. However, in some embodiments of the invention the central hub 17 may be connected to the substation transformer 12 and the second PMU 20 may be configured to measure the phase angle of the voltage at the substation transformer 12.

The first PMU 18 (which may constitute measurement apparatus) is connected to the central hub 17 and is operable to derive a first voltage phasor signal (or phase angle) from measurements made in the electrical route 6 at the first location spaced apart from a second location (discussed below). That is, the first PMU 18 is configured to determine the phase angle corresponding to a phase angle of a voltage output from the generation plant 2. In exemplary embodiments of the invention the first PMU 18 may form part of the central hub 17.

Further, in exemplary embodiments the generation plant may comprise one wind power generation plant (or other type of generation plant), which may be connected directly to the substation 12. In such exemplary embodiments the first PMU 18 may be connected to, or integrated with, the wind power generation plant.

In exemplary embodiments, a second PMU 20 (which may constitute measurement apparatus) may be disposed in the substation transformer 12. The second PMU 20 is operable to derive a second voltage phasor signal (or phase angle) from measurements at a first location in the electrical connector. That is, the second PMU 20 is configured to determine the phase angle corresponding to a phase angle of a voltage at the connection of the generation plant 2 to the bulk electrical power network 4, e.g. the end of the electrical route 6. In exemplary embodiments the second PMU 20 may form part of the substation 12. In other exemplary embodiments the second PMU 20 may be separate from the substation 12.

The first and second wind generation plants 14, 16 may have a non-firm connection agreement with the network operator. Each of the first and second PMUs 18, 20 may be e.g. an AREVA P847 from AREVA T&D of St. Leonards Avenue, ST17 4 LX, Stafford, United Kingdom.

Each of the PMUs may be operative to output digital data. To effect derivation of a voltage phasor signal, a PMU may be operative to synchronise measurements with an external time reference, such as from a GPS time source. The first and second voltage phasor signals derived by the first and second PMUs are conveyed to a digital controller 22. In exemplary embodiments the digital controller 22 may be located at the second wind generation plant 16. In alternative exemplary embodiments the digital controller 22 may be located in the central hub 17, at a network control point or at another location. The digital controller 22 may be located for ease of communication with the PMUs and the generation plant controller. The voltage phase angle measurements should be easily available and the control signal should be easily communicated to the controlled generation plant.

The digital controller 22 comprises a central processor 24 and data storage 26 in accordance with a typical configuration for an embedded microprocessor, microcontroller, or FPGA arrangement. The data storage 26 is operative to store data, e.g. relating to voltage phasor signals. The central processor 24 is configured to determine phase angle differences between the first and second phase angles, which may also be stored in the data storage 26.

Stored data may be conveyed periodically to a central location (not illustrated) for observation. The digital controller 22 may also be operative to transmit a generation plant control signal 28, which is conveyed to the second wind power generation plant 16. In exemplary embodiments the generation plant control signal 28 may be conveyed to a generation plant controller (not shown), which is operative to control the second wind power generation plant 16.

The design and implementation of hardware of the digital controller and firmware operative thereon is readily within the scope of the ordinary design skills of the skilled person.

The electrical power network 4 of FIG. 2 is subject to network loading, which is represented in FIG. 2 by means of a load component 32. In some exemplary embodiments additional load components may be located along the electrical route 6. These may represent the use of electrical power provided by the electrical power network 4 by consumers. There may also be other generation plants connected along the electrical route 6, not shown. The electrical route 6 of FIG. 2 is shown to be relatively short. However, this is a schematic representation only and in some exemplary embodiments the electrical route 6 may be long. For example, the electrical route may connect a very remote windfarm, far from centres of load of the bulk electrical power network 4.

Output from the first and second wind power generation plants 14, 16, if unrestricted, may cause power flows on the network, which may be liable to breach a limit (or constraint) of the network. The limit may be, for example, a thermal limit or a voltage rise limit. In other exemplary embodiments the limit may be a reverse power flow limit.

Figure 3:
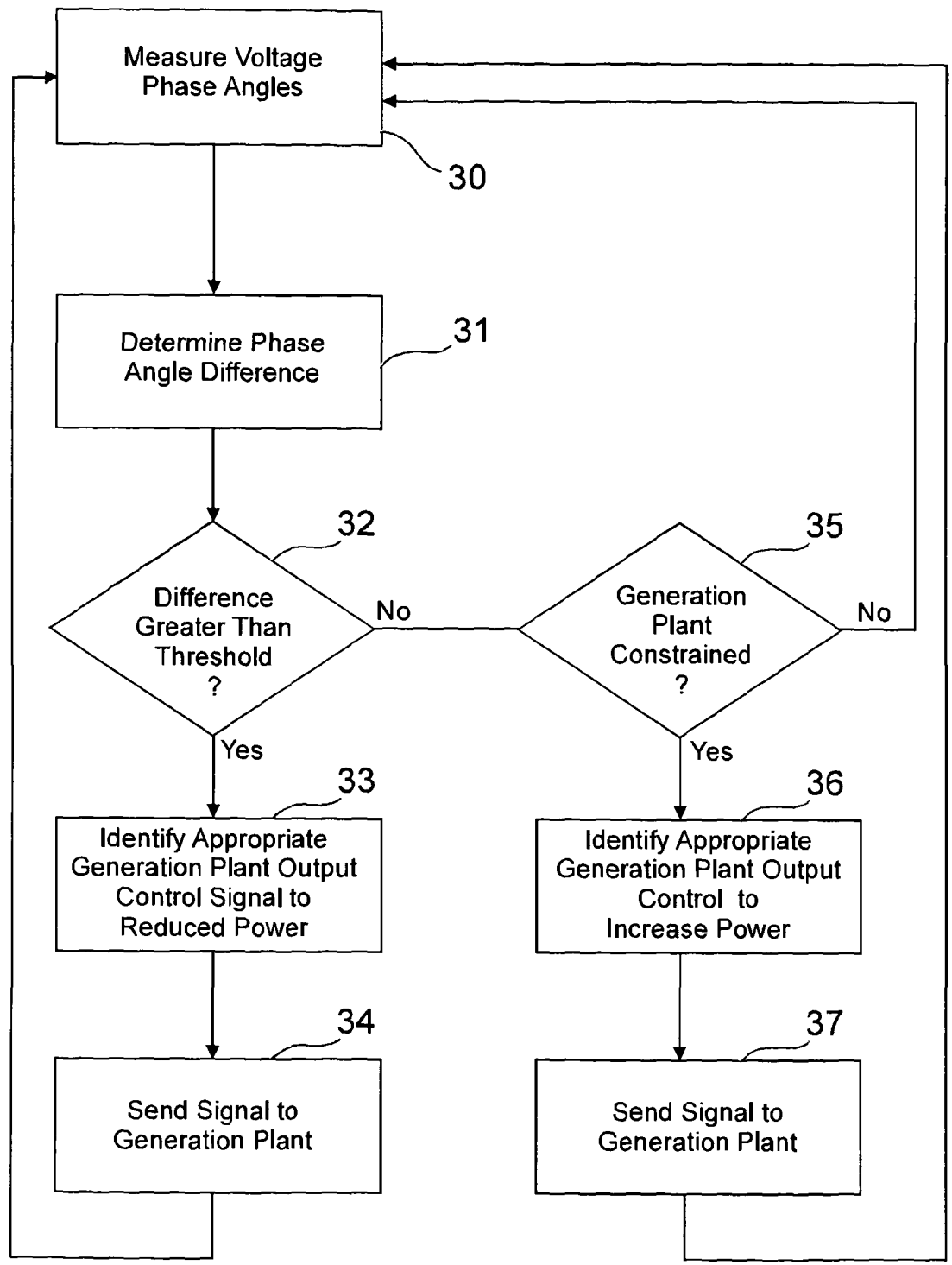
FIG. 3 is flow diagram of a method of controlling an output of a generation plant according to exemplary embodiments of the invention.

Referring to FIG. 3 there is shown a method of controlling an output of a generation plant.

Voltage phase angles are measured 30 as described above. A first voltage phase angle corresponds to a voltage waveform output from the generation plant 2. A second voltage phase angle corresponds to a voltage waveform at a remote point in the network. The remote point may for example be the end of the electrical route 6 at the point where it is connected to the bulk electrical power network 4.

As already stated, the actual measurement of the voltage phase angles is not an essential part of the invention. That is, the voltage phase measurements may be taken elsewhere and by other parties and used in the method of the invention.

A phase angle difference is determined 31 between the first phase angle and a second phase angle.

Referring back to FIG. 2, the first phase angle may be measured by the first PMU 18 connected to the hub 17. The first phase angle therefore represents the phase angle of the voltage output from the first and second wind power generation plants 14, 16 that comprise the generation plant 2. As discussed above, the disclosure is not limited to a generation plant 2 comprising two wind power (or other type) generation plants and may comprise more. Further, the disclosure is not limited to a generation plant 2 comprising a plurality of wind power (or other type) generation plants and may comprise only one.

The second phase angle may be measured by the second PMU 20. The second phase angle therefore represents the phase angle of the voltage at the location where the generation plant 2 is connected to the electrical power network 4. In the exemplary embodiment of FIG. 2 the generation plant 2 is connected to the bulk electrical power network 4 at substation 12.

The first and second phase angles are conveyed to the digital controller 22 where the central processor 24 may be configured to determine a phase angle difference between the first and second phase angles. The phase angle difference may be stored in data storage 26.

In certain exemplary embodiments the central processor 24 may transmit a generation plant control signal to the first and/or second wind power generation plants 14, 16 to produce more or less electrical power in dependence on the determined phase angle difference.

The phase angle difference is then compared with the predetermined threshold phase angle difference 32 to determine whether the phase angle difference is greater than the threshold phase angle difference. The threshold phase angle difference acts as a proxy of the most onerous technical condition (e.g., overload, voltage rise, etc.) on the electrical route 6 that would be produced during the worst case demand/generation scenario. This predetermined threshold phase angle difference may be calculated using a mathematical model to simulate critical network scenarios.

If the determined phase angle difference is larger than the predetermined threshold phase angle difference, too close to the predetermined threshold phase angle difference and/or approaching the predetermined threshold phase angle difference a power output for generation plant 2 that reduces the phase angle difference will be calculated 33.

A signal carrying the new set point for the power output of generation plant 2 will be sent 34 to generation plant 2.

The control process then returns to step 30 to carry on monitoring the phase angles and taking corresponding actions if required.

If the determined phase angle difference is smaller than the predetermined threshold phase angle difference it is determined whether the generation plant 2 is constrained. That is, it is determined whether the set point of the power output of generation plant 2 is below nominal (i.e., it has been curtailed) 35.

Then a new set point for the power output of the generation plant is calculated 36 that allows the increase of energy exported from the generation plant without allowing the phase angle difference to exceed the predetermined threshold phase angle difference. A signal carrying the new set point for the power output of generation plant 2 is then sent 37 to generation plant 2.

The method then returns to step 30 to continue monitoring of the voltage phase angles.

If the generation plant is determined not to be constrained at step 35 then the method returns to step 30 to continue monitoring of the voltage phase angles.

The phase angle difference relative to a predetermined threshold represents the capability of the electrical route 6 to transfer all of the available power from the generation plants 14, 16 to the bulk electrical power network 4. The central processor 24 may therefore transmit a generation plant control signal to the first and/or second wind power generation plants 14, 16. The generation plant control signal may control the generation plant 2 to produce more or less electrical power for the bulk electrical power network 4 in dependence on the determined phase angle difference relative to the predetermined threshold.

If the determined phase angle difference increases then this may indicate that the electrical route 6 has less available capacity and the production of electrical power by the generation plant 2 may therefore be reduced such that the phase angle difference remains within the predetermined threshold. If the phase angle difference decreases then this may indicate that the available capacity of the network 4 is increased and the electrical power produced by the generation plant 2 may therefore be increased.

As mentioned above, for a wind power generation plant the output of the generation plant may be decreased by 'spilling' wind, e.g. by changing the angle of the blades of a wind turbine. Increasing the output of a wind power generation plant may comprise changing the angle of the blades of a turbine to extract more energy from the wind where this is possible.

In some exemplary embodiments the method may include the measurement of the first and second phase angles. However, the inventors recognise that the actual measurement of the phase angles is not an essential element of the invention; the phase angles may be measured by other parties in other territories or countries and uploaded to e.g. a remote server. Alternatively, phase angles and phase angle differences can be derived without direct phasor measurements by using the state estimation process in an Energy Management System.

The loading condition of the electrical power network is reflected in a phase angle difference between voltages at the first and second locations with a network limit corresponding to a threshold value for the phase angle difference. Accordingly, the digital controller 22 is operative to compute the phase angle difference between the first and second voltage phasor signals and to compare the computed phase angle difference with the threshold value. If the phase angle difference reaches the threshold value, the digital controller is operative to transmit a generation plant control signal 28 that is operative to cause the second wind power generation plant 16 to reduce its output, e.g. by spilling wind or by tripping a unit, so as to transmit less power to the network.

Where the first generation plant 14 is connected to the grid on the basis of a firm agreement with the network operator, the second generation plant 16 is allocated a certain level of firm capacity and further non-firm capacity made available using the voltage phasor measurements described above. At any given time, the second generation plant supplies power up to the limit of firm capacity or the non-firm limit determined as described above, whichever is the greater.

The threshold value may be changed over time to take account of changing circumstances in the distribution network 10 and upstream of the distribution network.

A threshold value may be determined using network simulations as follows. Firstly, worst-case network loading and generation conditions are established or modelled, e.g. maximum generation, minimum load with the wind generation unconstrained. Then violation of a limit is determined and the output from a wind power generation plant with a non-firm connection is reduced until the violation is cleared. When the violation is cleared the threshold value is determined as the phase angle difference between the first and second voltage phasor signals measured with the first and second PMUs 18, 20.

The process may be repeated for different critical network loading and generating scenarios to identify the most conservative phase angle difference threshold that ensures secure and reliable operation of the network. The process can be repeated to provide second and further threshold values to be used as circumstances change, such as seasonal thermal limits and network topology. Depending on operating circumstances and requirements, in certain embodiments of the invention the threshold phase angle difference may be based on one or more of a thermal limit, a voltage rise limit, transformer reverse power flow limit, and a network stability limit. The limits may be constraints on the electrical route and/or the bulk electrical power network.

In exemplary embodiments the method may include comparing the determined phase angle difference to a threshold phase angle difference. As mentioned above, the threshold value may represent the phase angle difference experienced under the worst case scenario for a given electrical power network.

In determining the threshold, the parameters of the electrical power network may be used to model the worst case loading/generation scenario. The parameters of the network may include; the resistance and/or reactance of the transmission lines within the network; the loading on the network at different times of the day, week, month or year; and the maximum capacity of the generation plants supplying electrical power to the network.

By modelling the worst case scenario of an electrical power network a phase angle difference may be determined that represents that worst case scenario. The output of the generation plant may be controlled by comparison with the threshold.

In exemplary embodiments, one way of controlling the output of a generation plant may be to cease the output of the generation plant when the determined phase angle difference is greater than or equal to the threshold phase angle difference. This ensures that the output of the generation plant is zero when the worst case loading and generation conditions exist in the network.

In other exemplary embodiments the output of the generation plant may be controlled such that it is less than or equal to the threshold phase angle difference. That is, when the determined phase angle difference is greater than the predetermined threshold phase angle difference then the generation plant output may be reduced to a level at which the determined phase angle difference equals the threshold phase angle difference. Conversely, when the determined phase angle difference is less than the threshold phase angle difference then the generation plant output may be increased to a level at which the determined phase angle difference equals the threshold phase angle difference where this is possible. This can be achieved with a feedback control mechanism in which the power is incrementally reduced until the determined phase angle difference matches the threshold phase angle difference. In particular embodiments of the invention this may be preferable to ceasing the output of the plant because it may increase the energy delivered and reduce the stress on the generation plant.

In another exemplary embodiment, if the phase angle difference is above the threshold value, the power output of the generation plant is reduced in a linear relationship with the difference between the phase angle difference and the threshold value. In this embodiment, it is necessary to specify a conservative threshold, as the power output will settle to a value above the threshold as long as the constraint is binding.

In yet further embodiments the increase and decrease of the output of the generation plant may not have a linear relationship with the difference between the determined phase angle difference and the threshold phase angle difference but may follow a predetermined function based on the requirements of the network.

In exemplary embodiments the threshold may be determined based on the thermal constraints of the electrical power network. That is the threshold may be determined based on the maximum amount of current that may flow on a transmission or distribution line of the network.

In other exemplary embodiments the threshold may be determined based on the voltage rise constraints of the electrical power network. That is, the voltage rise in the network rises as the load on the network decreases and the generation in the network increases. The threshold may be determined to keep the voltage rise within acceptable limits.

In other exemplary embodiments the threshold may be determined based on the reverse power flow constraints of the electrical power network. That is, the power flow through a transformer within the network may only be acceptable in a direction from a high voltage side to a low voltage side. The threshold may be determined to ensure that this network rule is maintained.

In other exemplary embodiments the threshold may be determined based on stability constraints of the electrical power network. That is, certain limitations must be observed to prevent the system splitting, or having insufficient voltage support to transport energy, or experiencing unacceptably large power oscillations.

In an exemplary embodiment, the second phasor measurement unit (PMU) 20 is located and operative upstream of the substation transformer 12. Thus, loading upstream of the substation transformer can be taken into account in determining network stress and controlling the wind power generation plant 16.

In a further exemplary embodiment, a third PMU (not shown) is located and operative upstream of the substation transformer 12 on the electrical route 6. The third PMU is operative to derive a third voltage phasor signal (or phase angle). Thus, loading upstream of the substation transformer can be taken into account in determining network stress and controlling the wind power generation plant 16. In this case, the third voltage phasor signal is conveyed to the digital controller 22, so that phase angle differences are computed between the first voltage phasor signal (at the generation plant 16) and each of the second and third voltage phasor signals. Likewise, two threshold phase angle differences are defined as described previously. The digital controller 22 regulates the output of the generation plant 16 such that neither phase angle difference violates its respective constraint as determined relative to the threshold phase angle difference as described above. The electrical route is the section of the network where the constraint is being addressed. In this exemplary embodiment the voltage phase angle measurements bound the electrical route. This electrical route can include lines, transformers, substations, etc.

It is therefore possible to have two phase angle differences, one going deeper into the network (i.e. closer to the bulk electrical power network along the electrical route) than the other.

Figure 4:
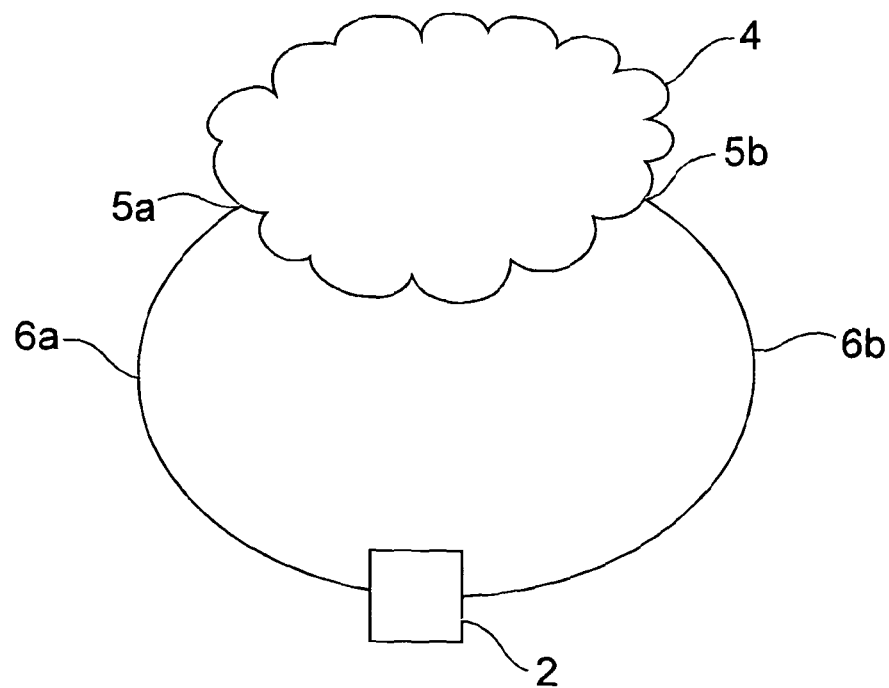
FIG. 4 is schematic diagram showing a generation plant connected to an electrical power network in accordance with exemplary embodiments of the invention.

Referring to FIG. 4 an exemplary embodiment is shown wherein the generation plant 2 is connected to the bulk electrical power network 4 by electrical routes 6a, 6b. The electrical route 6a is connected to the bulk electrical power network 4 at a first location 5a. The electrical route 6b is connected to the electrical power network at a second location 5b. This configuration may be termed a loop configuration.

In exemplary embodiments in accordance with FIG. 4 a second phase angle difference may be determined between the first phase angle representing the phase angle at the generation plant, and a third phase angle representing the phase angle of a voltage at the second location 5b. The first phase angle difference represents the available capacity of the electrical power network to receive electrical power from the generation plant over the electrical route 6a. The second phase angle difference represents the available capacity of the electrical power network to receive electrical power over the electrical route 6b.

The output of the generation plant 2 may be controlled in dependence on the first and/or the second phase angle difference. For example, if the first and/or second phase angle difference increases beyond its respective threshold then the generation plant output may be decreased.

In exemplary embodiments using the configuration of FIG. 4 two separate threshold phase angle differences may be determined. A first threshold phase angle difference may be determined based on the constraints of the electrical route 6a. A second threshold phase angle difference may be determined based on the constraints of the electrical route.

In exemplary embodiments the most restrictive threshold may be used to control the output of the generation plant. For example, if the first threshold imposes stricter controls on the generation plant output then the first threshold may be used to control the generation plant output. This ensures that the capacity of the network over both electrical routes 6a and 6b and at both locations 5a and 5b is never exceeded.

The third phase angle may be measured using a third PMU (not shown) located at location 5b and configured to measure a phase angle of a voltage at location 5b.

Figure 5:
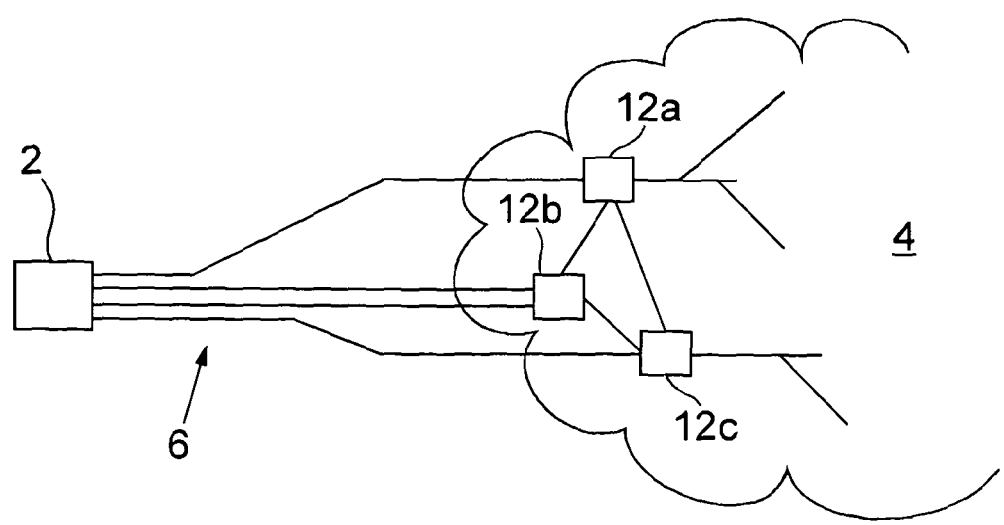
FIG. 5 is a schematic diagram showing a connection between a generation plant and an electrical power network according to exemplary embodiments of the invention.

Referring to FIG. 5 a generation plant 2 is shown connected to a bulk electrical power network 4 by a plurality of transmission or distribution lines. The plurality of transmission or distribution lines are comprised in a single electrical route 6. For the purposes of the invention the electrical route 6 may be treated in the same way as the single transmission or distribution line of other exemplary embodiments. For the avoidance of doubt it is therefore noted that the term 'electrical route' as used herein encompasses a single transmission or distribution line and a plurality of transmission or distribution lines.

The bulk electrical power network 4 comprises three substations 12a, 12b and 12c. As shown in the figure, two transmission or distribution lines are connected to substation 12b, one transmission or distribution line is connected to substation 12a and one transmission or distribution line is connected to substation 12c. Therefore the generation plant 2 is connected to the bulk electrical power network 4 at a plurality of substations.

The substations 12a, 12b, 12c are located at the same location as defined above. That is, the substations 12a, 12b, 12c are located in an area of the bulk electrical power network 4 wherein the phase angle at each of the substations 12a, 12b, 12c may be represented by a single phase angle. For example, the phase angles of the voltages at each of the substations 12a, 12b, 12c may be so close together that a single phase angle may provide meaningful information that may be used to control the output of the generation plant 2 in accordance with various exemplary embodiments.

In exemplary embodiments comprising the configuration of FIG. 5 a single PMU may be placed at any of the substations 12a, 12b, 12c and the phase angle of the voltage measured may be considered to correspond to the phase angle of the voltage at the connection of the generation plant 2 to the bulk electrical power network 4.

In embodiments of the invention disclosed a computer program product may be configured to store computer program code to execute the method described herein. The computer program product may for example comprise a computer hard drive, a floppy disc, CD, DVD, flash memory or other data media. The computer program product may alternatively or additionally comprise programmable logic, ASICs and/or firmware.

In other embodiments of the invention disclosed an apparatus such as a computer or computing device may comprise a microprocessor configured to carry out the method described herein. The apparatus may also be located within a generation plant controller.

The skilled person will be able to envisage further embodiments without departing from the scope of the invention as claimed.

The invention claimed is:

1. A method of controlling a power output of a generation plant, the method comprising:
   determining a phase angle difference between a first phase angle and a second phase angle;
   regulating the power output of the generation plant in dependence on a value of the phase angle difference during a time that the generation plant is connected to a bulk electrical power network by an electrical route;
   wherein the first phase angle corresponds to a phase angle of a voltage waveform at an output of the generation plant;
   wherein the second phase angle corresponds to a phase angle of a voltage waveform at a location in the bulk electrical power network;
   wherein there is at least one electrical power flow to or from the electrical route at a respective location between a point where the first phase angle is measured and a point where the second phase angle is measured; and
   wherein regulating the power output of the generation plant comprises comparing the determined phase angle difference to a predetermined threshold phase angle difference, said determined phase angle difference representing a capability of the electrical route to transfer the power output from the generation plant to the bulk electrical power network.

2. The method according to claim 1 wherein the first phase angle corresponds to a phase angle of a voltage at a connection of the generation plant to the electrical route.

3. The method according to claim 1 wherein the second phase angle corresponds to a phase angle of a voltage at a connection of the bulk electrical power network to the electrical route.

4. The method according to claim 1 wherein regulating the power output of the generation plant comprises increasing or decreasing the power output of the generation plant in dependence on the value of the determined phase angle difference.

5. The method according to claim 1 wherein regulating the power output of the generation plant comprises reducing the power output of the generation plant in dependence on the determined phase angle difference being greater than or equal to the predetermined threshold phase angle difference.

6. The method according to claim 1 wherein regulating the power output of the generation plant comprises increasing or decreasing the power output of the generation plant to maintain the determined phase angle difference less than or equal to the threshold phase angle difference.

7. The method according to claim 1 further comprising determining the threshold phase angle difference based on thermal constraints of the electrical route.

8. The method according to claim 7 wherein determining the threshold phase angle difference based on the thermal constraints of the electrical route comprises modelling the phase angle difference under a specific condition of load on the electrical route and under a specific condition of generated electrical power connected to the electrical route.

9. The method according to claim 8 wherein the specific condition of load on the electrical route is minimum load, and wherein the specific condition of generated electrical power connected to the electrical route is maximum generated electrical power connected to the electrical route.

10. The method according to claim 1 further comprising determining the threshold phase angle difference based on at least one of:
    voltage rise constraints of the electrical route;
    reverse power flow constraints of the electrical route;
    transient stability of the electrical route; and
    voltage stability and oscillatory stability of the electrical route.

11. The method according to claim 1 further comprising measuring the first phase angle at a connection point of the generation plant to the electrical route.

12. The method according to claim 1 further comprising measuring the second phase angle at a connection of the bulk electrical power network to the electrical route.

13. The method according to claim 1 wherein the generation plant is connected to the bulk electrical power network through first and second electrical routes and the phase angle difference is a first phase angle difference corresponding to the phase angle difference across the first electrical route, the method further comprising:
    determining a second phase angle difference between the first phase angle and a third phase angle; and
    regulating the power output of the generation plant in dependence on at least one of the first phase angle difference and the second determined phase angle difference;
    wherein the third phase angle corresponds to a voltage waveform at a location within the bulk electrical power network; and
    wherein the second phase angle difference corresponds to the phase angle difference across the second electrical route.

14. The method according to claim 13 wherein regulating the power output of the generation plant comprises decreasing the power output of the generation plant in dependence on the first phase angle difference being greater than or equal to a first predetermined threshold phase angle difference and/or the second phase angle difference being greater than or equal to a second predetermined threshold phase angle difference.

15. The method according to claim 13 wherein regulating the power output of the generation plant comprises increasing or decreasing the power output of the generation plant to maintain the first phase angle difference less than or equal to a first threshold phase angle difference and/or to maintain the second phase angle difference less than or equal to a second threshold phase angle difference.

16. A computer program product comprising a non-transitory computer-usable medium having computer-readable program code embodied therein, the computer-readable program code adapted to be executed to implement a method of controlling a power output of a generation plant, the method comprising:
    determining a phase angle difference between a first phase angle and a second phase angle;
    regulating the power output of the generation plant in dependence on a value of the phase angle difference during a time that the generation plant is connected to a bulk electrical power network by an electrical route;

wherein the first phase angle corresponds to a phase angle of a voltage waveform at an output of the generation plant;

wherein the second phase angle corresponds to a phase angle of a voltage waveform at a location in the bulk electrical power network;

wherein there is at least one electrical power flow to or from the electrical route at a respective location between a point where the first phase angle is measured and a point where the second phase angle is measured; and wherein regulating the power output of the generation plant comprises comparing the determined phase angle difference to a predetermined threshold phase angle difference, said determined phase angle difference representing a capability of the electrical route to transfer the power output from the generation plant to the bulk electrical power network.

17. An apparatus comprising a processor configured to carry out the method according to claim 1.

18. A generation plant controller comprising the apparatus of claim 17.

19. An electrical power network comprising a generation plant controller according to claim 18.

* * * * *